United States Patent [19]

Wagner

[11] 4,044,429
[45] Aug. 30, 1977

[54] LOCKING SAFETY PIN AND KEY CARRIER

[76] Inventor: Robert W. Wagner, 1102 Lowenhill St., Pittsburgh, Pa. 15216

[21] Appl. No.: 720,753

[22] Filed: Sept. 7, 1976

[51] Int. Cl.² .............................................. A44B 9/10
[52] U.S. Cl. ...................................... 24/156; 24/234; 24/158
[58] Field of Search ............ 24/13, 15, 156 R, 156 P, 24/150 SP, 86, 234, 235, 233, 158, 159, 155 R

[56] References Cited

U.S. PATENT DOCUMENTS

| | | | |
|---|---|---|---|
| 2,227,676 | 1/1941 | Schwartz et al. | 24/158 P |
| 2,246,495 | 6/1941 | Alessi et al. | 24/158 S |
| 3,296,671 | 1/1967 | Pawlowski | 24/156 R |
| 3,570,076 | 3/1971 | Wagner | 24/156 P |

*Primary Examiner*—G. V. Larkin
*Attorney, Agent, or Firm*—Parmelee, Miller, Welsh & Kratz

[57] ABSTRACT

An improved self-locking safety pin unit or device has been devised in which a thumb and finger rotatable sleeve is adapted, when turned in one direction, to raise and then turn or swing, an upper, loop-like, latching or nose part under resilient spring pressure out of engagement with a pointed end of a pin part and then into a sidewise offset, clearing or open relation with respect thereto when a lower, pin-supporting, loop-like, base part is gripped to retain it in a stationary position. The lower base or loop part is shaped to receive keys or other eyelet-like elements thereon that, when the pin part is in an open position, may be introduced thereon by first swinging a pivoted pin closure to an open position which then is moved to a closing-off position for key retention on the lower loop part.

15 Claims, 8 Drawing Figures

LOCKING SAFETY PIN AND KEY CARRIER

BACKGROUND OF THE INVENTION

1. Field of the Invention

This invention relates to an improved type of locking safety pin that may be used for garments, diapers, etc. and, particularly, that may be securely attached to the clothing of the wearer for safely carrying elements such as keys.

2. Description of the Prior Art

Conventional safety pins involve the use of a flexible wire body, a latch head that is carried by one end of the body, and a flexible pin that is carried by the other end for snap-engagement within the latching head. Such a type of pin tends to become bent and damaged in usage and thus is not fully safe when used in connection with clothing, etc. of the user. There has been a need for a type of pin which will be sure latching or locking in its operation and which will retain its latched relation in ordinary, as well as rough usage. In my U.S. Pat. No. 3,570,076, I disclosed a safety pin device which eliminated inherent deficiencies of and difficulties encountered in the use of a conventional pin. The present invention deals with an improved type of automatic latching safety pin device which will have a better operative relationship of its parts, can be more easily assembled and disassembled, and may be utilized for carrying elements or objects, such as keys, in a safe relation.

BRIEF SUMMARY OF THE INVENTION

It has thus been an object of the invention to provide an improved locking safety pin device.

Another object has been to devise a pin device that can be thumb and finger operated initially against torsion force exerted by one spring for moving a latching loop end part thereof out of a latching position with respect to a pointed pin part, and which may then be operated against torsion force exerted by a second spring for turning such latching part to a sidewise-open or clearance-defining relation with respect to the pointed end of the pin part thereof.

A further object of the invention has been to devise a locking pin that is adapted to receive and carry elements such as keys in a safe manner as suspended from clothing of the wearer.

A still further object of the invention has been to provide a locking pin device of a safety type that has a lower part constructed to receive and carry key elements in a supported relation thereon and that is provided with means for retaining the key elements in position on a lower loop part when its pin part is being opened or is in an open position for mounting the device on clothing or the belt of a person.

These and other objects will appear to those skilled in the art from the illustrated embodiment and the claims.

DESCRIPTION OF THE PREFERRED EMBODIMENT

Figure 1:
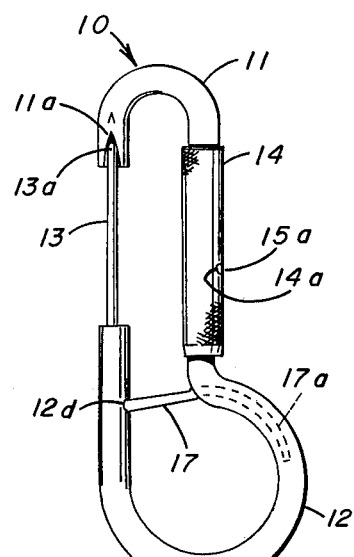
FIG. 1 is a side view in elevation showing a locking pin device constructed in accordance with the invention in a fully closed, latched position, and with its key retention pin or foot in a fully closing-off position.

A locking safety pin unit or device 10 has been provided having an upper, pin-closing, hollow or tubular latching loop part or nose 11, a lower, key-retaining hollow or tubular loop or base part 12, a rigid, pointed pin part 13 which is secured at its lower or back end to securely extend from within and in rigid relation from an outer or front end of the lower loop part 12, and a rotatable, operating sleeve part 14. Opening and closing movement of the upper or latching loop part 11 is accomplished by the rotatable sleeve part 14 that is positioned over and between an inner or back end of the upper loop part 11 and an inner or back end of the lower loop part 12 to operatively connect them together. The sleeve 14 is flexibly or resiliently resisted in its manually effected forward turning movement by a spiral torsion spring 16 that is operatively carried within the back end portion of the lower loop part 12. An initial turning of the sleeve part 14 advances a cam end portion 15a of a wire-like camming element 15 from a lowermost position to an uppermost position within a closed end, spiral or forwardly upwardly sloped, camming guide slot or groove portion 14a of the sleeve part 14. The camming element 15 is of spring-like, inverted V-shape, and has a cross extending side leg that serves as cam end portion 15a that extends through a side hole 11b in the wall of the back end portion of the upper loop part 11 to ride in the slot portion 14a.

Figure 4:
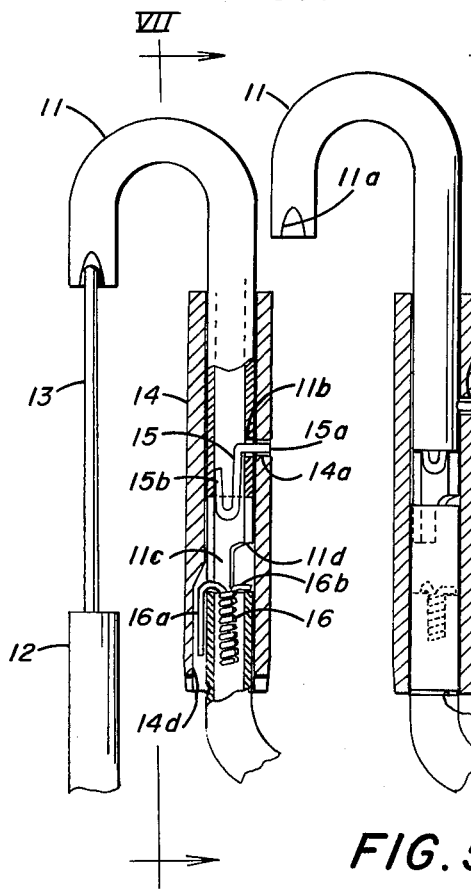
FIG. 4 is an enlarged, side fragmental elevation in partial section, with the parts of the device in the closed or latched position of FIG. 1, and particularly illustrating the cooperating parts or elements that control the operation of its sleeve part.

As shown particularly in FIG. 4, the element 15 of somewhat spring-like metal construction has a lower, V or loop-shaped portion or body 15b which is shouldered or bent to frictionally fit under slight tension or in a sprung relation within the hollow wall of the inner or back end of the upper loop part 11. Its outwardly projecting cam end portion 15a extends at right angles with respect to the loop portion 15b through the side hole 11b into the closed-end, camming guide slot portion 14a. The sleeve 14 is principally retained in an operating position by the cam end portion 15a and may be removed for disassembly of the device 10 by pressing-in the end portion 15a to clear the guide slot portion 14a. When the sleeve 14 is inserted by sliding it on an inner end of the upper loop part 11, the end 15a will snap into the guide slot 14a.

The operating relationship between the cam end 15a and slot 14a enables the latching loop part 11 to be raised in such a manner as to clear a pointed end 13a of the pin part 13 from a latched or retained position within the open end of the loop part 11, such that the pointed end 13a may move sidewise out through a V-shaped slide slot, recess or notched portion 11a. Such initial manual turning of the sleeve 14 is accomplished against torsion resistance offered by a spiral torsion spring 16 to advance the cam or pin end portion 15a of the element 15 from its initial left hand end position of FIG. 1 (lowermost position of FIG. 8) in abutment with a lower end of the slot portion 14a to a final, right hand or clockwise advanced position in abutment with the other or upper end of the slot portion 14a (uppermost position of FIG. 8). This effects a full axial raising of the latching loop part 11 to clear or unlatch the pointed pin end 13a (see FIGS. 2 and 5). A swing-turning of the loop part 11 to the right is accomplished after the cam end 15a engages the upper or right hand end of the slot portion 14a and is effected under further spring tension, as controlled by torsion-turning and compressing, relatively small, lower-positioned, spiral, torsion spring 16.

Figures 7, 8:
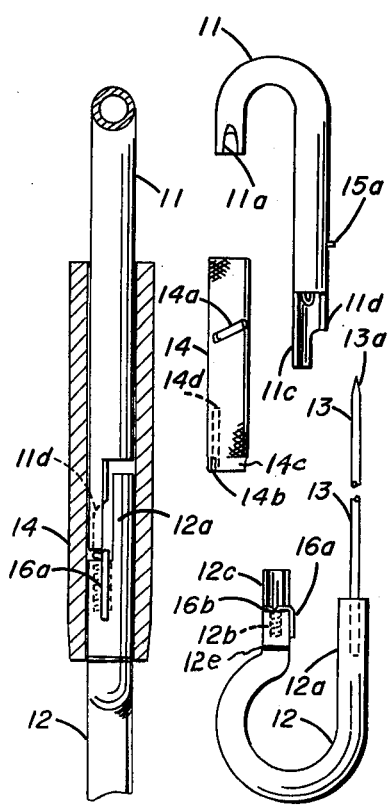
FIG. 7 is a fragmental view on the scale of and taken along the line of VII—VII of FIG. 4.
FIG. 8 is an exploded view further illustrating the construction of individual parts or elements of the device.

The torsion spring 16 is shown (see FIGS. 4, 7 and 8) provided with a relatively long, side-positioned leg end portion 16a which extends from one end of its centrally positioned, spirally looped body downwardly or axially, longitudinal in abutment along the outside of the wall of the inner or back end portion of the bottom loop part 12 to latch-engaged with a lower end portion of the sleeve part 14. The side leg portion 16a and a shorter length, opposite leg portion 16b that abuts the edge of the back end portion of the lower loop part 12, in effect, anchor the body of the spring 16 in an operating position within the hollow wall of the back end portion of the lower loop part 12. The sleeve 14 has a latching, cross-notch or recessed portion 14b that is shown open across a slightly inwardly turned or tapered, lower end, rim or flange edge portion 14c of the sleeve part 14. As shown in FIGS. 4 and 7, a longitudinal recess or slot portion 14d extends from one cross notch 14b along the inside of the wall of the sleeve part 14 to receive and latch with the leg 16a of the spring 16. The lower end of the leg 16a of the spring 16 is adapted to fit or latch-engage within the latching recess portion 14d of the sleeve part 14 to anchor it for flexible, torsion turning movement during a forward manual rotation of the sleeve part 14. The lower, tapered-in end portion 14c of the sleeve part 14 is adapted to slide-on the back end portion of the lower loop part 12, with the leg 16a in alignment with and extending into the cross notch 14b and the recess 14d. The notches 14b give the tapered end portion 14c of the sleeve part 14 a flexible, snap-in type of fit within a circular groove or recess portion 12e to removably retain the sleeve part in a rotative operating position on the lower loop part. The spiral turns or convolutions of the main body of the spring 16 fit within an inner or back end operating portion 12b of the bottom loop part 12, and its shorter leg portion 16b rests in cross abutment on an end wall edge of the part 12. Normally when the spring 16 is unflexed, the spirals of its central body have a relatively wide spaced relation, and when it is flexed by a forward rotation of the sleeve part 14, the spacing is lessened. The torsion flexing of the spring 16 is effected by reason of the connected or interlatched relation of its leg portion 16 within the notch 14b and the recess or slot 14d in the lower end of the sleeve part 14.

As shown, the inner ends of the hollow, upper and lower loop parts 11 and 12, each has an offset camming tab or tail end portion 11c and 12c. The portions 11c and 12c serve as operating end portions that have somewhat complementary interfitting relation when the device 10 is in its fully latched position of FIGS. 1 and 4. However, the upper loop part 11 has a cut-out camming tab or tail portion 11d extending about half way from the end of the portion 11c that functions to permit the turning of the loop part 11 to its final, sidewise-open position of FIG. 3.

Figure 2:
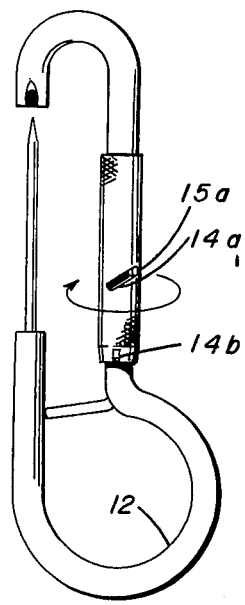
FIG. 2 is a side view on the scale of and similar to FIG. 1, except that it shows the parts of the pin device in a preliminary unlatched position attained by turning its operating sleeve part clockwise to raise its upper loop part out of a retaining or latching position with respect to the pointed end of a pin part.
Figures 5, 6:
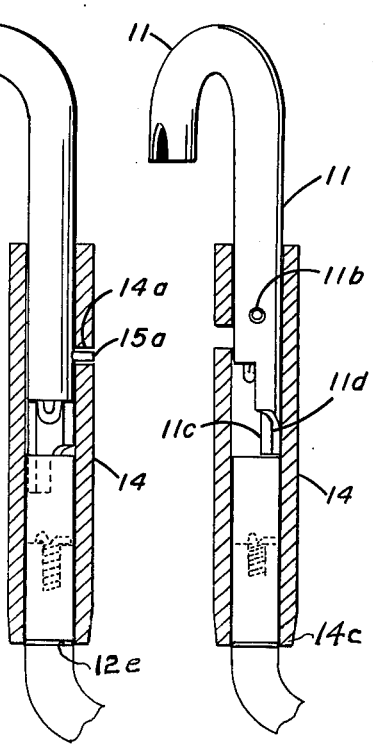
FIG. 5 is a fragmental side view in elevation on the enlarged scale of FIG. 4 and in partial section, showing the relation of operating parts when the device is in the intermediate position of FIG. 2; at this time, an open notch or slot in the upper loop part has been raised to clear a pointed end of the pin part.
FIG. 6 is a view on the scale of similar to FIGS. 4 and 5, but illustrating the final sidewise-open, turned position of the upper loop part shown in FIG. 3.

In operation, the sleeve part 14 may be manually gripped between the thumb and index finger of the hand of the user and turned forwardly (clockwise) against the tension of spring 16 from the position of FIGS. 1 and 4 to the axially raised, pin end clearing position of FIGS. 2 and 5. At the end of this part of the operation, the lug or cam end 15a of the camming element 15 has reached the uppermost closed end of the guide slot portion 14a in the sleeve 14. To complete the operation, the manual forward turning force is continued so as to swing the upper loop part 11 to a side-positioned, open or clearance defining relation with the end 13a of the pin 13. This is accomplished against further torsion or turning tension exerted by the lower spring 16, and is enabled by the forwardly offset cut-off tail end portion 11d which, when in a raised position with respect to the loop part 11, will engage the semi-circular tail end portion 12c of the inner or back end of the lower loop part 12 to ride thereover.

Since the leg 16a is turned about the end portion of the lower loop 12 by reason of its latched position within recess portion 14c of the sleeve 14 when the sleeve is rotated, this induces a tightening tensioning of the spirals or convolutions of the central body of the spring 16 to build up its turning resistance when the sleeve 14 is rotated to open the pin 13. After the end 13a of the pin has been inserted within an article of clothing, the manual turning force on the sleeve 14 may be released which results in an automatic, initial, swing-back of the upper loop part 11 from the position of FIG. 3 to the position of FIG. 2, as effected by the built-up tension of the lower-positioned spiral swing 16. The upper loop part or nose 11 is then automatically axially lowered or returned from the raised position of FIG. 2 to the fully closed, downward, latching position of FIG. 1 under residual tension force exerted by the spring 16 to, in cooperation with the cam end 15a and the camming slot portion 14a, complete the automatic closing and latching operation.

It will be noted that when the upper and lower loop parts 11 and 12 are in a fully latched relation with respect to each other, that their half cut-out tab or tail portions 11c and 12c are in a substantially complementary interfitting relationship. However, when the upper or nose part 11 is in its position of FIGS. 2 and 5, the tab end portion 11c is raised substantially one-half its length with respect to the tab end portion 12c to a position at which the innermost end of the offset tab portion 11d will ride on the back or inner end of the tab portion 12c.

As above pointed out, the operating sleeve part 14 can be downwardly slid-off or removed from its normal cross-connecting and mounting relation over innermost or back end portions of the upper loop 11 by pushing-in the cam end 15a of the upper spring 15 to clear it with respect to the guide slot 14a. It may then be endwise-upwardly slid-off the back end portion of the lower loop part 12. However, the camming element 15 and the spring 16 will remain in their respective positions on the loop parts 11 and 12 until they are separately removed against their tension-retained respective mounted positions.

Figure 3:
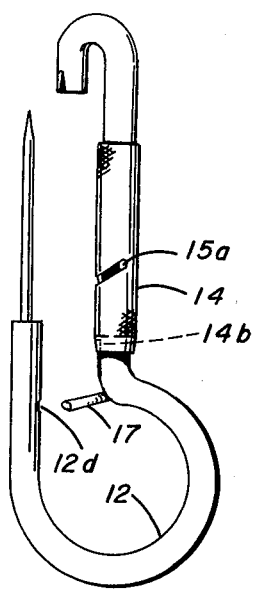
FIG. 3 is a side view on the same scale as FIGS. 1 and 2, but showing the device in a fully open position in which its sleeve part has been employed to turn the upper loop part to the right, away from the end of the pin part, to present an opening or clearance spacing therebetween into which clothing may be introduced to pass the pin part therethrough; this view also shows a pivotally mounted closure foot or pin in an endwise-open position to receive an element to be carried on its lower loop part, such as a key.

To enable the use of the lower loop part 12 for receiving and retaining elements, such as keys, in a secure relation thereon, it is shown provided with an enlarged body diameter. In addition, a closure element 17 of pin-like or wire rod construction is swingably carried adjacent the innermost end of the body of the lower loop part 12 to extend towards and into a frictional closing engagement with a slightly depressed latch or keeper portion 12d adjacent the opposite end of the loop body. As shown particularly in FIG. 1, the closure element or part 17 has a curvilinear pivotal mounting portion 17a that extends along the interior of the tubular wall of the loop part 12. In FIG. 3, the element 17 is shown in its open position at which time keys or other eyelet carrying elements may be inserted over the open pin 13 into the encircling wall of the body of the loop part 12. Thereafter, the pin-like element 17 may be closed to retain a key-like element wholly within the encircling body of the loop portion of the part 12. The foot of the closure element 17 is preferably of slightly flexible metal construction to provide a snap-in and snap-out of its end within the keeper or latch portion 12d.

I claim:

1. In a self-locking safety pin device, having a pair of cooperating upper and lower hollow loop parts, having a pointed pin part secured at its back end to project from a front end of the lower loop part and with its pointed end positioned in a cooperative relation with a front end of said upper loop part, and having a sleeve part rotatably positioned in an operating relation over back end portions of said pair of loop parts, the improvement which comprises, a back end portion of said upper loop part having a hole extending tranversely therethrough, a camming element operatively positioned within the back end portion of said upper loop part and having a cam end portion adapted to project outwardly through said hole, said sleeve part having a closed-end spiral-shaped guide slot portion in its wall into which said cam end portion of said element is adapted to extend for guided movement therealong to raise said upper loop part with respect to said lower loop part to a clearing position with respect to the pointed end of said pin part when said sleeve part is manually forwardly rotated with respect to said upper loop part to advance said cam end portion from a lower position to an upper position along said slot portion and to then swing said upper loop part to a sidewise-open position with respect to the pointed end of said pin part when the manual forward rotation of said sleeve part is continued, and a spring operatively positioned within the back end portion of said lower loop part and connected to said sleeve part to flexibly resist manual forward rotation of said sleeve part.

2. A self-locking safety pin as defined in claim 1 wherein, means cooperates with said camming element and said spring after a release of said sleeve part for swinging said upper loop part from a sidewise-open to an aligned sidewise-closed position with respect to the pointed end of said pin part, and for then moving said upper loop part axially into a latching position with respect to the pointed end of said pin part.

3. A self-locking safety pin as defined in claim 1 wherein, back end portions of said upper and lower loop parts have cooperating offset camming tail portions and said tail portions are operated by the manual forward rotation of and by spring-induced return rotation of said sleeve part.

4. A self-locking safety pin as defined in claim 3 wherein said spring has a spiral-shaped flexible torsion resisting body carried within the back end portion of said lower loop part and adapted, upon a release of said sleeve part to effect a reverse rotation of it to move said cam end portion from an upper to a lower position within said guide slot portion and to then substantially axially align the front end portion of said upper loop part with the pointed end of said pin part.

5. A self-locking safety pin as defined in claim 4 wherein, said spring has a leg end portion extending from said spiral-shaped body along an outside of the wall of the back end portion of said lower loop part, and said sleeve part has a latch portion engaged by said leg end portion, whereby manual rotation of said sleeve part to open said pin part will tension the body of said spring by reason of the cooperative movement of said leg end portion with said sleeve part.

6. A self-locking safety pin as defined in claim 3 wherein, said spring has a central body of spiral convolutions which at one end terminates in a short length leg portion adapted to abut an edge of the back end portion of said lower loop part and has an opposite longitudinal leg portion extending axially along the outside of the back end portion of said lower loop part for retaining said spiral body in position within the hollow back end of said lower loop part, and said sleeve part has means detachably connected with said longitudinal leg portion for effecting movement thereof during manual forward rotative movement of said sleeve part to apply torsion tensioning to the convolutions of said central body.

7. A self-locking safety pin as defined in claim 3 wherein, said sleeve part has a turned-in lower rim rotatably positioned on the back end portion of said lower loop part, a latching portion extends from said rim along the inside of said sleeve part, and said spring has a leg portion adapted to fit within said latching portion for imparting torsion tension on said spring when said sleeve part is manually forwardly rotated to open said upper loop part with respect to said pin part.

8. A self-locking safety pin as defined in claim 3 wherein said camming element has a V-shaped body positioned in a sprung position with said upper loop part and has a side leg portion extending from one side of said body and constituting said cam end portion.

9. A self-locking safety pin as defined in claim 3 wherein a pin-like cross-extending closure element is pivotally carried by said lower loop part to swing to and from a closing-off position across the body of said part.

10. A locking safety pin as defined in claim 1 wherein, said spring has a spiral body carried within the back end portion of said lower loop part, has a longitudinal leg portion extending downwardly along the outside of the wall of said lower loop part, and has an opposite cross leg portion cooperating with said first-mentioned leg portion to retain said spring in an operating position within said lower loop part.

11. A self-locking safety pin as defined in claim 10 wherein, a lower end portion of said sleeve part has a recess portion therein, and said longitudinal leg portion slidably fits within said recess portion to connect said spring to said sleeve part and retain said sleeve part in an operating position on said lower loop part.

12. In a locking safety pin, having a pair of upper and lower cooperating hollow loop parts, having a pointed pin projecting from a front end of said lower loop part for latching engagement within a front end of said upper loop part, and having an operating sleeve rotatably carried on back end portions of said pair of loop parts for moving said upper loop part into and out of a latching position with respect to the pointed end of said pin part, the improvement which comprises, a swingable pin-like closure element having a leg portion pivotally mounted within said lower loop part adjacent one end of its body and adapted to extend across to an opposed portion of its body for swinging movement into and out of a closing-off position across the body, whereby a key-like element may be introduced from a front end portion of said lower loop part into the body thereof for retention thereon.

13. A locking safety pin as defined in claim 12 wherein, a camming element is of spring-like construction and is carried within a back end portion of said upper loop part and has an outwardly projecting cam end portion, said operating sleeve has a closed-end guide slot therealong that is curved in an advanced relation from one end to the other end thereof and operatively receives said cam end portion of said camming element therein, spring tension engendered by said camming element normally retains said operating sleeve on said upper loop part, spring means is carried by said lower loop part and has a connected engagement at one end with said sleeve part, said upper and lower loop parts having camming tail end portions that are operated by manually rotating said sleeve part forwardly against tension exerted by said spring means to move said upper loop out of a closing-off position with respect to the pointed end of said pin part, and said spring means upon a manual release of said sleeve part, rotating said sleeve part in a reverse direction to return said upper loop part to a closing-off position with respect to the pointed end of said pin part.

14. A locking safety pin as defined in claim 12 wherein, the opposed portion of the body of said lower loop part has a keeper portion, and a front end of the leg portion of said closure element is adapted to swing into and out of a latched position within said keeper portion.

15. A locking safety pin as defined in claim 14 wherein, said keeper portion is a depression within the body of said lower loop part, and the leg portion of said closure element is of flexible construction to snap into and out of position within said keeper portion.

* * * * *